S. FISHER.
Wheel-Plow.

No. 30,727. Patented Nov. 27, 1860.

UNITED STATES PATENT OFFICE.

SAMUEL FISHER, OF WEST WINDSOR, NEW JERSEY.

IMPROVEMENT IN PLOWS.

Specification forming part of Letters Patent No. 30,727, dated November 27, 1860.

*To all whom it may concern:*

Be it known that I, SAMUEL FISHER, of West Windsor, in the county of Mercer and State of New Jersey, have invented certain new and useful Improvements in Gang or Cultivator Plows; and I do hereby declare the following to be a full, clear, and exact description of the construction and operation of the same, reference being had to the accompanying drawings, making a part of this specification, in which—

Figure 1:
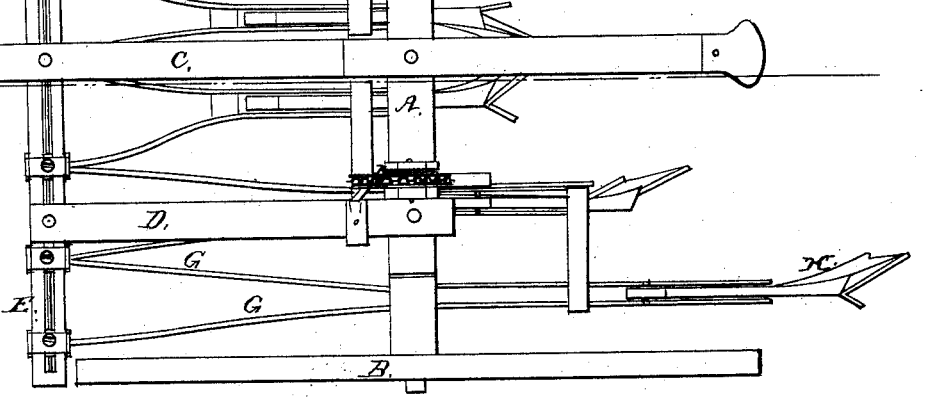
Figure 2:
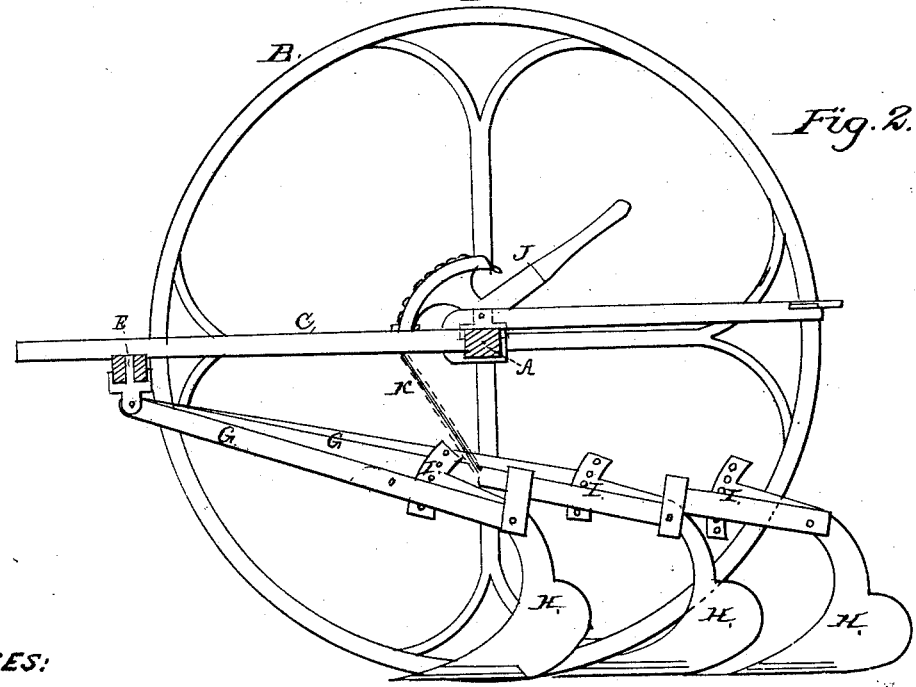

Figure 1 represents a top plan of the plow, and Fig. 2 a vertical section taken through the red line $x\ x$ of Fig. 1.

Similar letters of reference, where they occur, denote like parts of the plow in both of the figures.

My invention relates to the manner in which I connect the plow-stocks to the frame and the plows to the stocks, so as to admit of being adjusted as to width between furrows, raised or lowered on the frame, and so as to trip and release themselves when striking against any resisting obstruction.

To enable others skilled in the art to make and use my invention, I will proceed to describe the same with reference to the drawings.

A is an axle, supported in high wheels B B, and to this axle A are secured the parallel bars or frame-pieces D D, which, together with the central frame, C, which is extended forward and rearward to make a tongue in front and a lever-seat, L, in rear for the driver or operator to sit upon, make the supports for the slotted bar E, to which the plow stocks or beams G are attached by means of lugs or blocks F, which are adjustable in the slot in said cross-bar E. Two plow-beams may be connected to each lug or block F, so as to work in pairs, the beams G G spreading from their point of connection to the lug toward their rear ends for this purpose, their front ends being pivoted to the lug, so as to freely swing thereon.

The plows H are respectively pivoted to the rear ends of the beams G by means of their curved standards M, as at $a$. The portions of the standards above the pivoted point curve upward and forward, and their extreme upward and forward ends have a curved arc, N, upon them, furnished with a series of holes, 1, 2, 3, &c., through one of which a wooden pin, I, may be placed, so as to rest on top of the beam. This pin should be strong enough to sustain the ordinary strain upon the plow in turning over or cultivating the soil, but weak enough to break or give way when the plow strikes against any unyielding substance, in which event the plow will swing upon its pivoted point $a$, and thus prevent breaking any part but the pin, which can be readily replaced.

The plow-beams G G may be coupled in pairs by bars or links O O, or in sets of two, three, or more, as may be preferred, and to the pairs or sets may be connected chains or cords K, which are also connected to an arc, P, arranged on a lever, J, which lever extends back, so that the driver or conductor may from his seat L raise up or let down the plows. On the arcs there may be dogs or projections $b$, which will catch over the frame-pieces D and hold up the plows. A slight lateral movement of the lever J will connect or detach this dog.

Q Q are sleeves or bosses on the journals of the axle for the purpose of increasing or diminishing the width of track of the wheels. The plows may be of any of the known or approved forms.

Having thus fully described the nature and object of my invention, what I claim therein as new, and desire to secure by Letters Patent, is—

The combination of the pivoted beams G with the pivoted plows supported by a pin, when arranged to operate in the manner and for the purpose herein set forth; and this I claim whether the plows be made adjustable, and be raised or lowered, or held by the devices herein described, or by others accomplishing a similar object by substantially the same means.

SAMUEL FISHER.

Witnesses:
   A. B. STOUGHTON,
   I. HIRSCH.